US010048897B2

(12) United States Patent
Baptist et al.

(10) Patent No.: US 10,048,897 B2
(45) Date of Patent: Aug. 14, 2018

(54) MAKING CONSISTENT READS MORE EFFICIENT IN IDA+COPY SYSTEM

(71) Applicant: International Business Machines Corporation, Armonk, NY (US)

(72) Inventors: Andrew D. Baptist, Mt. Pleasant, WI (US); Greg R. Dhuse, Chicago, IL (US); Scott M. Horan, Clarendon Hills, IL (US); Ravi V. Khadiwala, Bartlett, IL (US); Wesley B. Leggette, Chicago, IL (US); Manish Motwani, Chicago, IL (US); Jason K. Resch, Chicago, IL (US); Praveen Viraraghavan, Chicago, IL (US); Ilya Volvovski, Chicago, IL (US); Trevor J. Vossberg, Chicago, IL (US); Ethan S. Wozniak, Park Ridge, IL (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 15/363,813

(22) Filed: Nov. 29, 2016

(65) Prior Publication Data

US 2017/0153944 A1 Jun. 1, 2017

Related U.S. Application Data

(60) Provisional application No. 62/260,735, filed on Nov. 30, 2015.

(51) Int. Cl.
*G06F 3/06* (2006.01)
*G06F 11/14* (2006.01)
(Continued)

(52) U.S. Cl.
CPC .............. *G06F 3/067* (2013.01); *G06F 3/064* (2013.01); *G06F 3/0619* (2013.01);
(Continued)

(58) Field of Classification Search
CPC ............ G06F 11/1076; G06F 11/1092; G06F 11/1402; G06F 11/1464; G06F 12/0866;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — John J Tabone, Jr.
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device receives a data access request for a data object and determines a first revision number of a corresponding set of EDSs stored among first SU(s) and a second revision number of a corresponding trimmed copy of the set of EDSs stored among second SU(s). When the second revision number compares favorably to the first revision number, the computing device issues the data access request to the first SU(s) and/or the second SU(s) and issues the data access request for the data object to only the first SU(s) when it doesn't.

25 Claims, 8 Drawing Sheets

(51) Int. Cl.

| | |
|---|---|
| *G06F 11/10* | (2006.01) |
| *H03M 13/15* | (2006.01) |
| *G06F 9/48* | (2006.01) |
| *G06F 9/50* | (2006.01) |
| *G06F 12/0866* | (2016.01) |
| *G06F 12/0891* | (2016.01) |
| *G06F 15/173* | (2006.01) |
| *H03M 13/00* | (2006.01) |
| *H04L 29/06* | (2006.01) |
| *H04L 29/12* | (2006.01) |

(52) U.S. Cl.
CPC .......... *G06F 3/0629* (2013.01); *G06F 3/0644* (2013.01); *G06F 3/0665* (2013.01); *G06F 3/0689* (2013.01); *G06F 9/4881* (2013.01); *G06F 9/5083* (2013.01); *G06F 11/1076* (2013.01); *G06F 11/1092* (2013.01); *G06F 11/1402* (2013.01); *G06F 11/1464* (2013.01); *G06F 12/0866* (2013.01); *G06F 12/0891* (2013.01); *G06F 15/17331* (2013.01); *H03M 13/1515* (2013.01); *G06F 2201/84* (2013.01); *G06F 2211/1007* (2013.01); *G06F 2212/1024* (2013.01); *G06F 2212/154* (2013.01); *G06F 2212/263* (2013.01); *G06F 2212/403* (2013.01); *H03M 13/616* (2013.01); *H03M 13/6502* (2013.01); *H04L 61/1582* (2013.01); *H04L 61/6004* (2013.01); *H04L 63/101* (2013.01)

(58) Field of Classification Search
CPC .......... G06F 12/0891; G06F 15/17331; G06F 2201/84; G06F 2211/1007; G06F 2212/1024; G06F 2212/154; G06F 2212/263; G06F 2212/403; G06F 3/0619; G06F 3/0629; G06F 3/064; G06F 3/0644; G06F 3/0665; G06F 3/067; G06F 3/0689; G06F 9/4881; G06F 9/5083; H03M 13/1515; H03M 13/616; H03M 13/6502; H04L 61/1582; H04L 61/6004; H04L 63/101
USPC ....... 714/764, 702, 718, 751, 752, 763, 769, 714/770, 773, 799, 6.1, 6.2, 6.22, 6.24, 714/42; 711/111, 114, 170; 709/231; 707/822
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,307,263 B2 * | 11/2012 | Grube | G06F 11/1092 709/231 |
| 8,438,456 B2 * | 5/2013 | Grube | G06F 11/1092 709/231 |
| 8,448,044 B2 * | 5/2013 | Dhuse | H04L 9/085 365/184 |
| 8,555,130 B2 * | 10/2013 | Baptist | G06F 11/1076 707/822 |
| 8,595,596 B2 * | 11/2013 | Grube | G06F 11/1092 709/231 |
| 8,621,269 B2 * | 12/2013 | Vas | H04L 63/06 714/6.1 |
| 8,627,177 B2 * | 1/2014 | Dhuse | H04L 9/085 365/184 |
| 8,656,253 B2 * | 2/2014 | Leggette | G06F 21/6218 382/173 |
| 8,677,214 B2 * | 3/2014 | Grube | H03M 13/616 714/758 |
| 8,689,354 B2 * | 4/2014 | Grube | G06F 11/1076 726/26 |
| 8,726,120 B2 * | 5/2014 | Baptist | G06F 11/1076 707/822 |
| 8,726,127 B2 * | 5/2014 | Grube | H04L 67/1097 707/822 |
| 8,966,341 B2 * | 2/2015 | Grube | H04L 67/1097 707/822 |
| 8,984,371 B2 * | 3/2015 | Gladwin | H04L 65/602 714/6.22 |
| 9,304,843 B2 * | 4/2016 | Resch | G06F 11/1076 |
| 9,390,283 B2 * | 7/2016 | Resch | G06F 21/6218 |
| 9,413,393 B2 * | 8/2016 | Grube | H04L 67/06 |
| 9,483,398 B2 * | 11/2016 | Grube | G06F 12/0638 |
| 9,537,609 B2 * | 1/2017 | Gladwin | G06F 11/2053 |
| 9,607,168 B2 * | 3/2017 | Grube | G06F 21/6218 |
| 9,900,316 B2 * | 2/2018 | Resch | H04L 63/101 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |

(56) References Cited

U.S. PATENT DOCUMENTS

| | | | |
|---|---|---|---|
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0083053 | A1* | 4/2011 | Grube .............. G06F 11/1092 714/752 |
| 2011/0083061 | A1* | 4/2011 | Grube .............. G06F 11/1092 714/776 |
| 2014/0298061 | A1* | 10/2014 | Volvovski .......... G06F 3/0625 713/323 |
| 2016/0217041 | A1* | 7/2016 | Resch .................... G06F 8/65 |
| 2017/0123920 | A1* | 5/2017 | Dhuse ............. G06F 11/1092 |
| 2017/0153942 | A1* | 6/2017 | Cabral ................. G06F 3/067 |
| 2017/0153978 | A1* | 6/2017 | Motwani .............. G06F 3/067 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

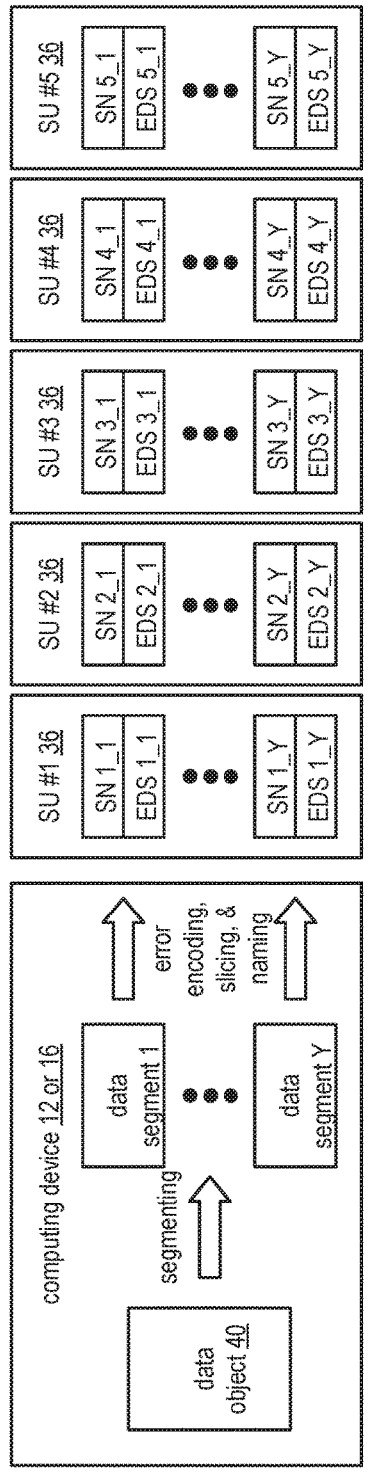
FIG. 3
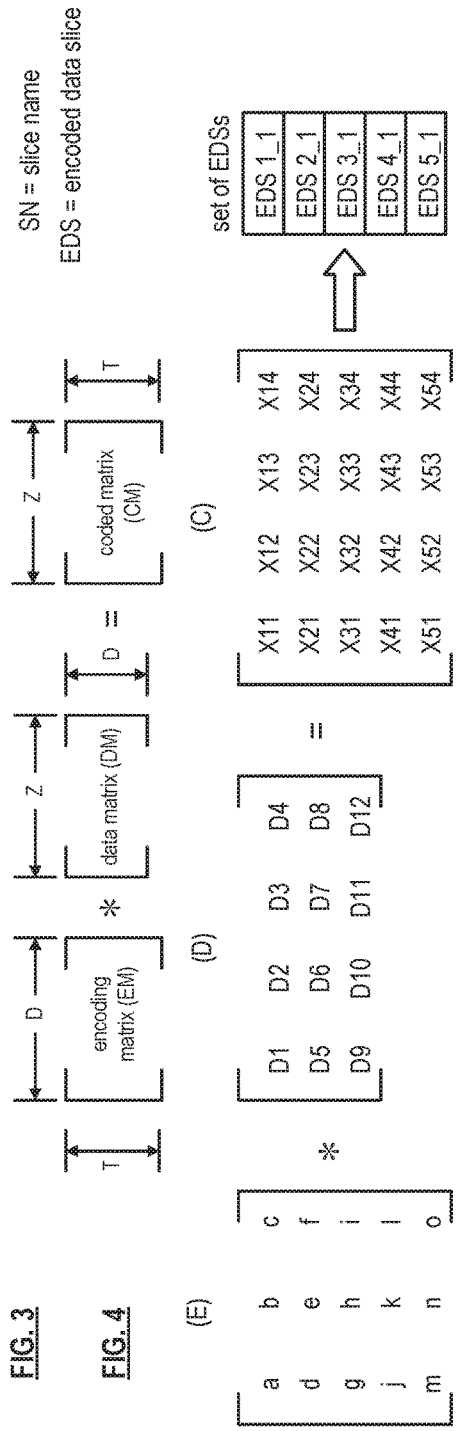
FIG. 4
FIG. 5
FIG. 6

MAKING CONSISTENT READS MORE EFFICIENT IN IDA+COPY SYSTEM

CROSS REFERENCE TO RELATED PATENTS

The present U.S. Utility Patent Application claims priority pursuant to 35 U.S.C. § 119(e) to U.S. Provisional Application No. 62/260,735, entitled "ACCESSING COPIES OF DATA STORED IN A DISPERSED STORAGE NETWORK," filed Nov. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide adequate means by which various versions of data stored therein can be tracked efficiently and adequately. There continues to be a need in the art for coordinating within the system and among different devices the various versions of data stored therein.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
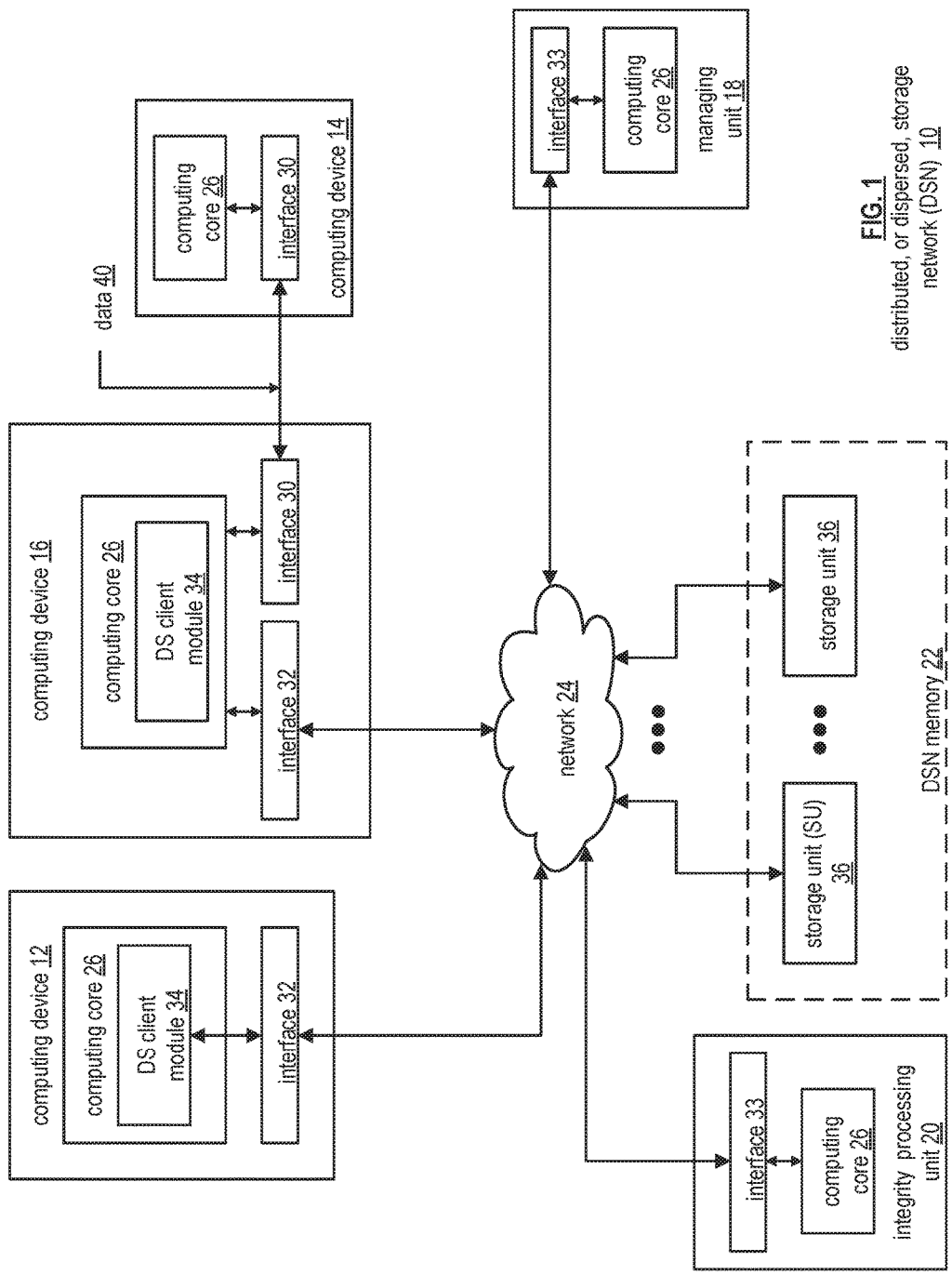
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
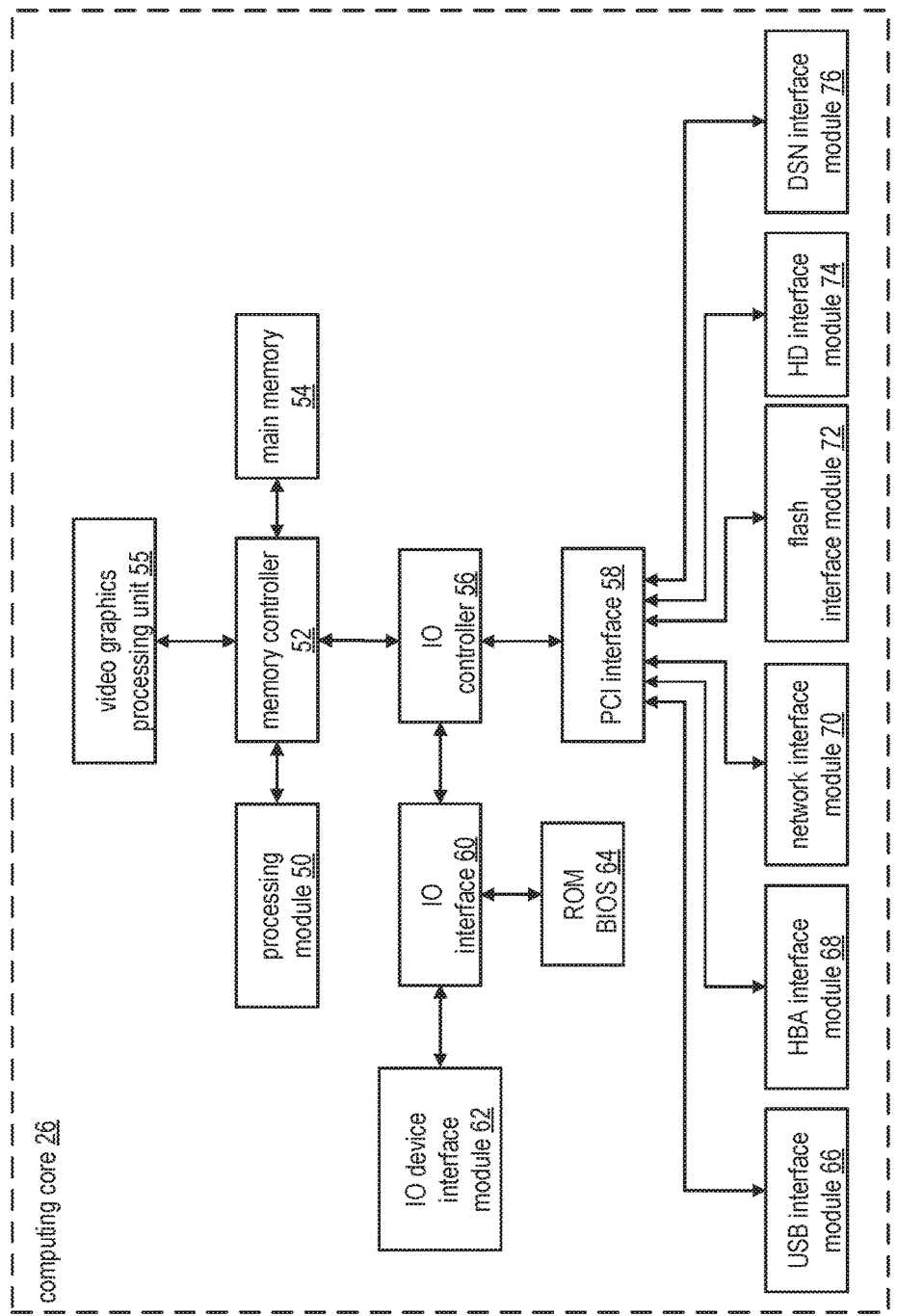
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
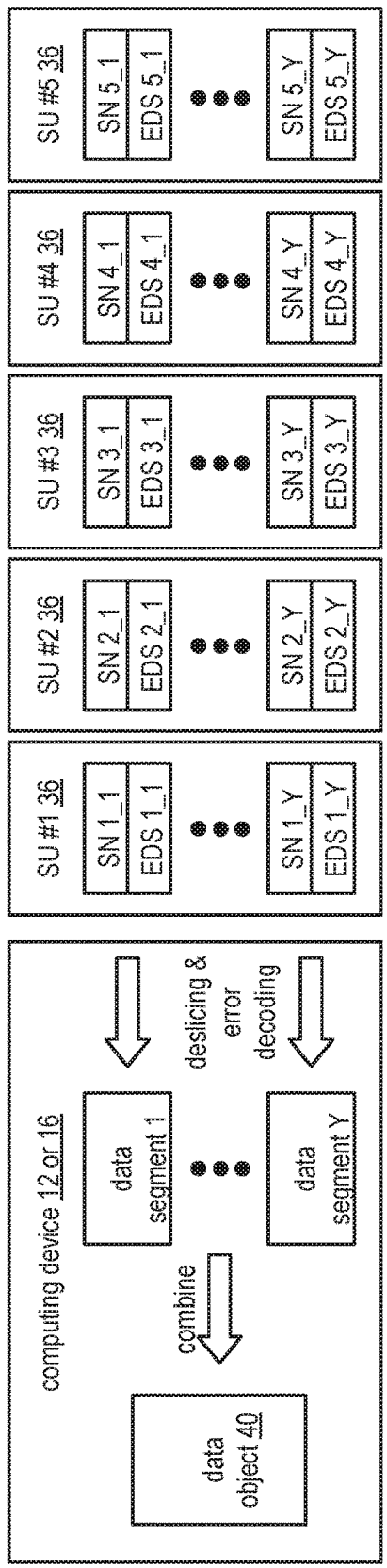
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
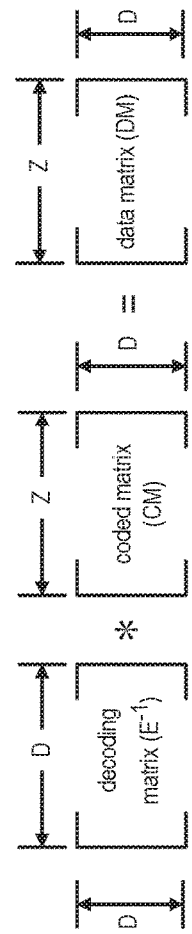
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
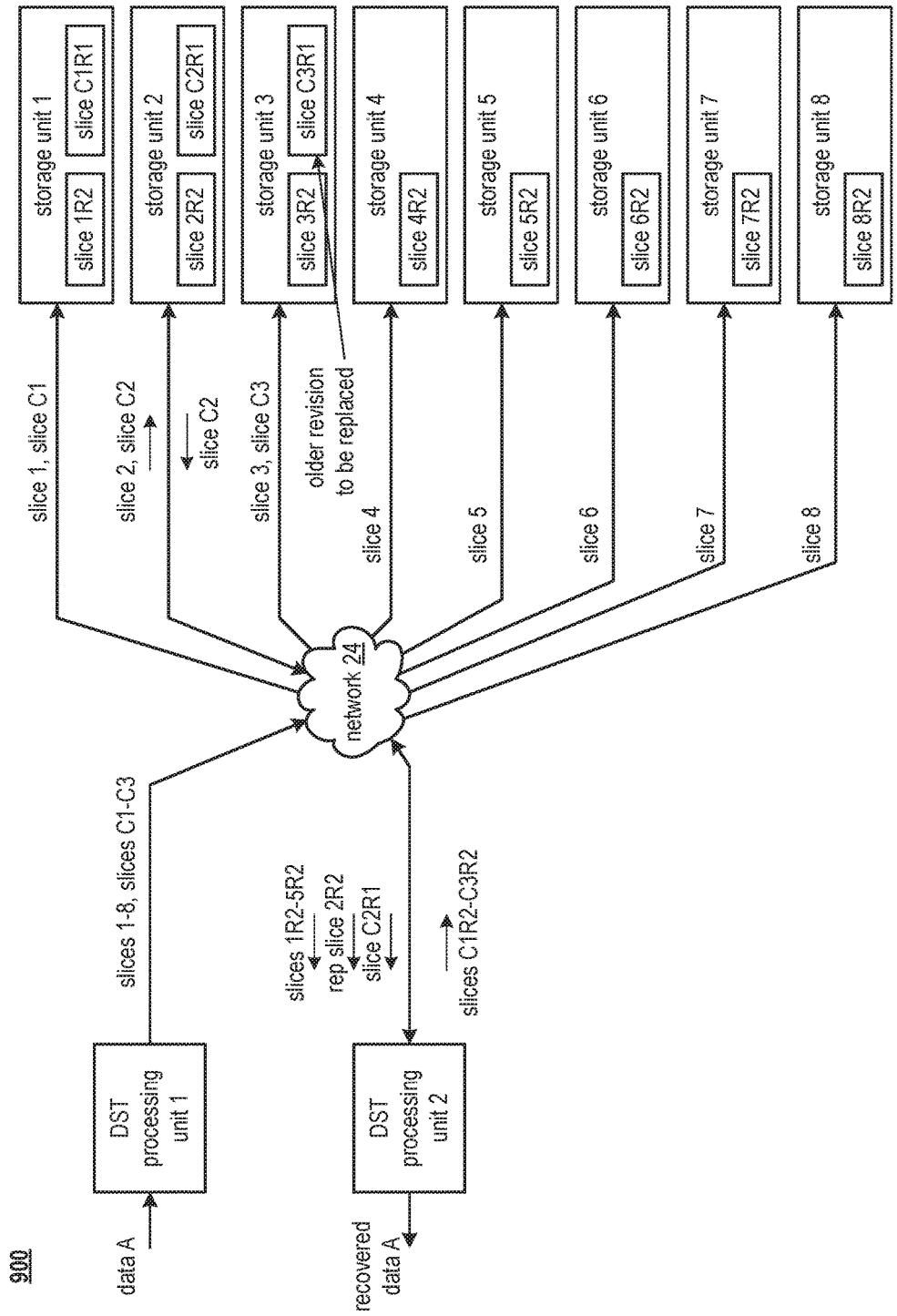
FIG. 9 is a schematic block diagram of another embodiment of a dispersed storage network (DSN) in accordance with the present invention.

FIG. 9 is a schematic block diagram of another embodiment 900 of a dispersed storage network (DSN) that includes distributed storage and task (DST) processing units 1-2, the network 24 of FIG. 1, and a set of storage units 1-8. Each DST processing unit may be implemented utilizing the computing device 12, 14, 16, the managing unit 18, and/or the integrity processing unit 20 such as with respect to FIG. 1, a SU 36 such as with respect to FIG. 3 or FIG. 7, and/or any other device implemented within a DSN to perform operations associated with a DST processing unit. Each storage unit (SU) may be implemented utilizing a DST execution (EX) unit and/or a SU 36 such as with respect to FIG. 3 or FIG. 7. The DSN functions to update a revision of stored data.

In an example of operation of the updating of the revision of the stored data, the DST processing unit 2 identifies a revision level of a copy slice, where the DST processing unit 1 has dispersed storage error encoded data A utilizing copy dispersal parameters to produce one or more sets of copy slices that includes the copy slice, where a copy decode threshold number of copy slices of each set of copy slices are required to recover the data, and where the copy decode threshold number is less than half of the copy IDA width number. The identifying includes interpreting a revision level indicator of the retrieved copy slice of a set of slices, e.g., retrieved copy slice C2R1 indicating revision 1. The identifying further includes interpreting a list slice response, e.g., slice name C2R1 indicating revision 1.

Having identified the revision level of the copy slice, the DST processing unit 2 identifies a revision level of a slice, where the DST processing unit 1 has dispersed storage error encoded the data A utilizing dispersal parameters to produce one or more sets of encoded data slices 1-8 that includes the slice 2, where each set of encoded data slices includes an IDA width number of slices, where a decode threshold number of slices of each set of encoded data slices are required to recover the data, and where the decode threshold number is greater than half of the IDA width number. The identifying includes interpreting a revision level indicator of a retrieved representation of a slice of the set of slices, e.g., revision 2 of slice2R2. The identifying further includes interpreting a list slice response, e.g., slice name 2R2 indicating revision 2. The identifying still further includes interpreting a read-if-revision-greater response indicating the revision level.

When the revision level of the slice is greater than the revision level of the copy slice, the DST processing unit 2 facilitates recovery of the data to produce recovered data A utilizing a decode threshold number of slices of each of the one or more sets of slices. The facilitating includes, for each set of the one or more sets of encoded data slices, retrieving the decode threshold number of slices, e.g., slices 1R-5R2 when the decode threshold number is 5, and dispersed storage error decoding the retrieved slices utilizing the dispersal parameters to produce the recovered data A.

Having produce the recovered data A, the DST processing unit 2 facilitates updating of the one or more sets of slices to include copy slices other revision level of the one or more sets of slices. The facilitating includes dispersed storage error encoding the recovered data A using the copy dispersal parameters to produce updated one or more sets of copy slices, e.g., copy slices C1R2-C3R2, and sending, via the network 24, the updated one or more sets of copy slices to the storage units 1-3 for storage.

Figure 10:
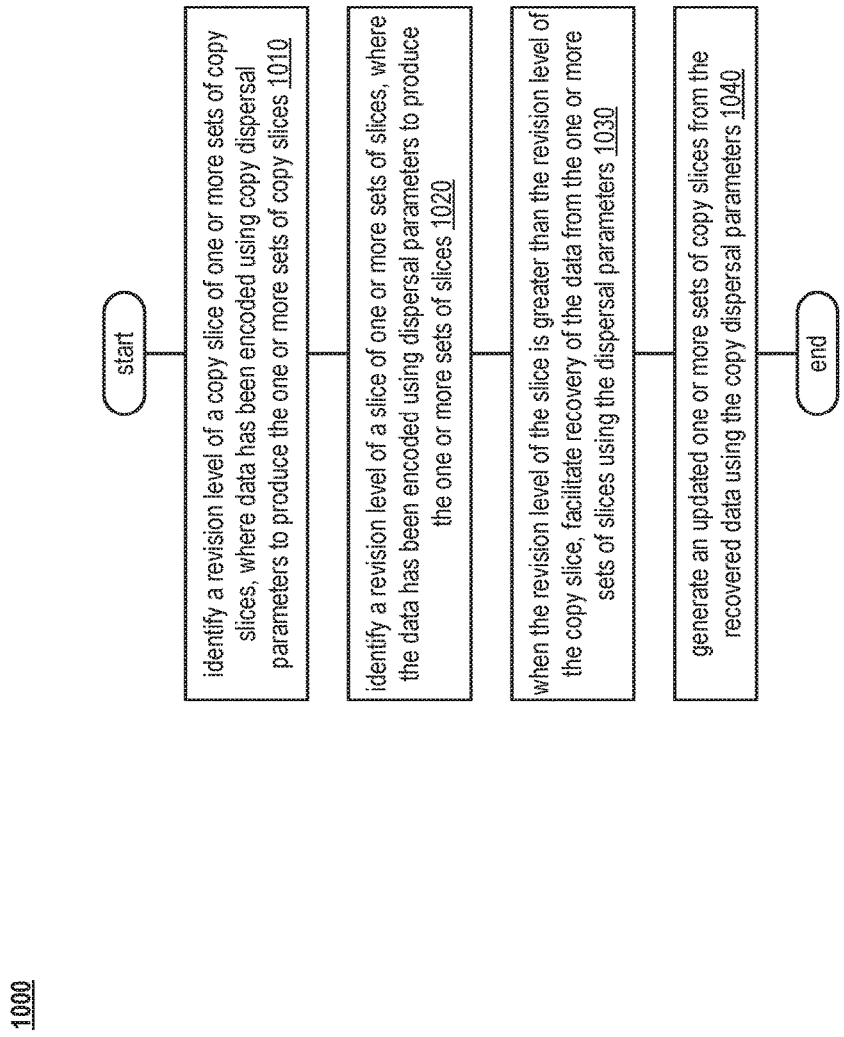
FIG. 10 is a flowchart illustrating an example of updating a revision of stored data in accordance with the present invention.

FIG. 10 is a flowchart illustrating an example of updating a revision of stored data. The method 1000 includes a step 1010 where a processing module (e.g., of a distributed storage and task (DST) processing unit) identifies a revision level of a copy slice of one or more sets of copy slices, where data has been encoded using copy dispersal parameters to produce the one or more sets of slices. The data has been dispersed storage error encoded utilizing the copy dispersal parameters to produce the one or more sets of copy slices that includes the copy slice, where each set of copy slices includes a copy or so algorithm (IDA) width number of copy slices, where a copy decode threshold number of copy slices of each set of copy slices are required to recover the data, and where the copy decode threshold number is less than half of the copy IDA width number. The identifying includes interpreting a revision level indicator of the retrieved copy slice of a set of slices and interpreting a list slice response.

The method 1000 continues at the step 1020 where the processing module identifies a revision level of a slice of one or more sets of slices, where the data has been encoded using the dispersal parameters to produce the one or more sets of slices. The data has been dispersed storage error encoded using dispersal parameters to produce the one or more sets of slices that includes the slice, where each set of slices includes an IDA width number of slices, where a decode threshold number of slices of each set of slices are required to recover the data, and where the decode threshold number is greater than half of the IDA width number. The identifying includes at least one of interpreting a revision level indicator of a retrieved representation of a slice of a set of slices, interpreting a list slice response, and interpreting a read-if-revision-greater response.

When the revision level of the slice is greater than the revision level of the copy slice, the method 1000 continues at the step 1030 where the processing module facilitates recovery of the data from the one or more sets of slices using the dispersal parameters. For example, for each set of the one or more sets of slices, the processing module retrieves a decode threshold number of slices and dispersed storage error decodes the retrieved slices using the dispersal parameters to produce recovered data.

The method 1000 continues at the step 1040 where the processing module generates an updated one or more sets of copy slices from the recovered data using the copy dispersal parameters. For example, the processing module disperse storage error encodes the recovered data using the copy dispersal parameters to produce the updated one or more sets of copy slices and sends the updated one or more sets of copy slices to storage units for storage.

Figure 11:
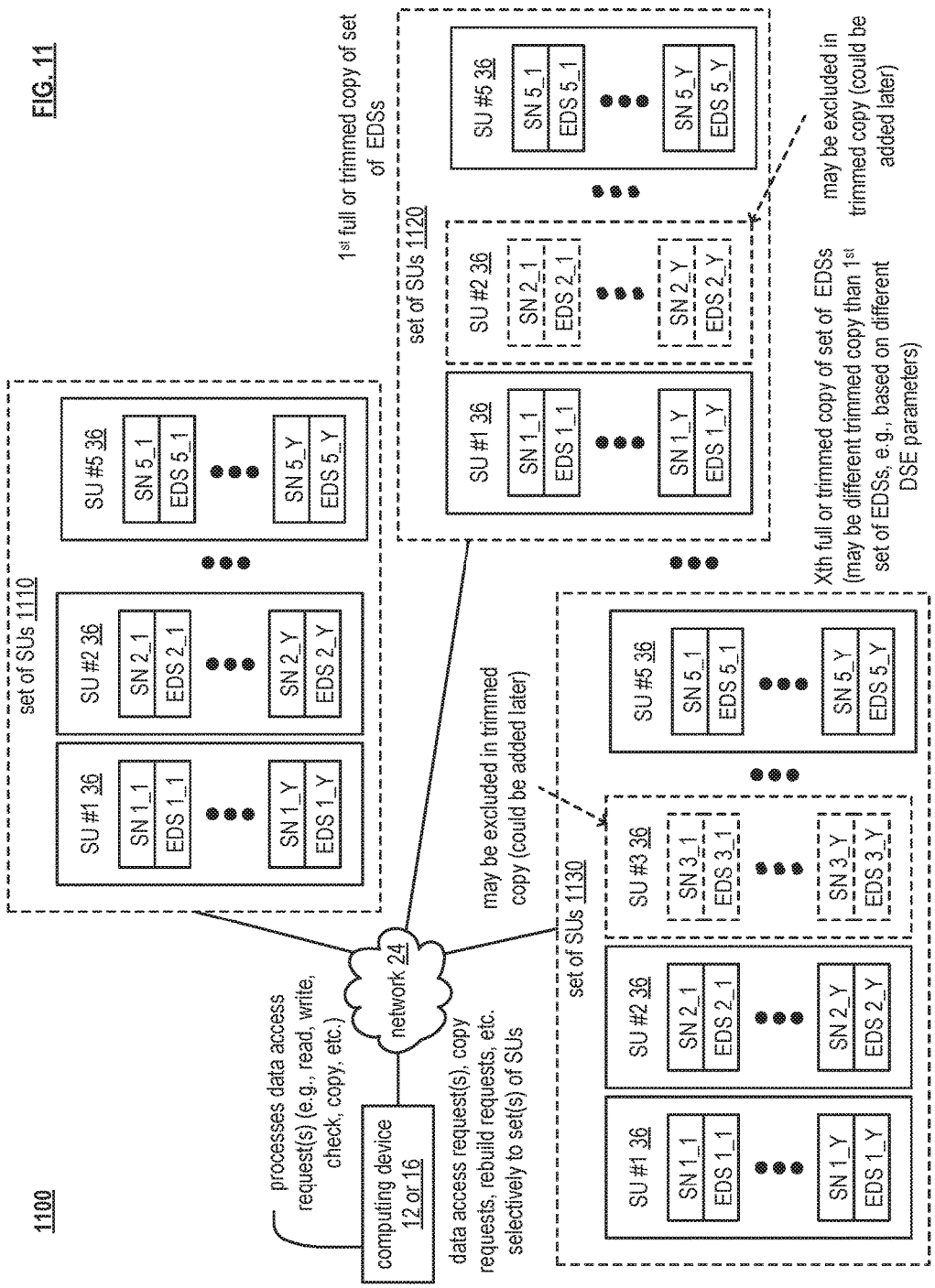
FIG. 11 is a schematic block diagram of another embodiment of a DSN in accordance with the present invention.

FIG. 11 is a schematic block diagram of another embodiment 1100 of a DSN in accordance with the present invention. A computing device 12 or 16 interacts with one or more sets of SUs (e.g., set of SUs 1110, set of SUs 1120, and/or set of SUs 1130) within the DSN via network 24. Each of the set of SUs includes one or more storage units (SUs) that store copies or trimmed copies of encoded data slices (EDSs) that are based on a set of EDSs (e.g., an original set of EDSs). Note that different trimmed copies of EDSs may have different characteristics and be based on different dispersed error encoding (DSE) parameters. In some examples, a trimmed copy of EDSs may be implemented as including fewer than all of the EDSs (e.g., such as yet including at least one of a decode threshold, a read threshold, and/or a write threshold number of EDSs). For example, consider that the set (original) of EDSs is based on a 10-16 DSE parameter based system (e.g., such as a system with 16 EDSs based on 16 pillars and a read and/or decode threshold number of 10), then a particular trimmed copy of the set of EDSs may be any number of those EDSs that is greater than or equal to the read and/or decode threshold number of 10 and fewer than the total or pillar number of 16 EDSs (e.g., such a particular trimmed copy of the set of EDSs could include 10, 11, 12, 13, 14, or 15 EDSs selected from the total or pillar number of 16 EDSs). As such, note that since such a particular trimmed copy of the set of EDSs includes fewer than the total or pillar number of EDSs, a fewer numbers of SUs may be used when distributedly storing that particular trimmed copy of the set of EDSs as opposed to distributedly storing the total or pillar number of EDSs.

In other examples, a trimmed copy of EDSs may be implemented as an alternative copy of EDSs that is based on a different set of DSE parameters than were used to generate the set (original) of EDSs. In a specific example, consider that the set (original) of EDSs is based on a 10-16 DSE parameter based system (e.g., such as a system with 16 EDSs based on 16 pillars and a read and/or decode threshold number of 10), then a particular trimmed copy of the set of EDSs may be an generated based on a different DSE parameter based system such as a 3-5 DSE parameter based system (e.g., such as a system with 5 EDSs based on 5 pillars and a read and/or decode threshold number of 3). As such, a given particular trimmed copy of the set of EDSs may be narrower (e.g., 5 versus 16 in this specific example). Moreover, even different respective sets of trimmed copy of the set of EDSs may be based on fewer than all of the EDSs based on the alternative (e.g., 3-5) DSE parameter based system (e.g., such as yet including at least one of a decode threshold, a read threshold, and/or a write threshold number of EDSs such as 3 or 4 in a 3-5 DSE parameter based system). Note that any desired combinations of such different forms of trimmed copies of EDSs may be used to generate different respective trimmed copies of EDSs (e.g., a first trimmed copy of EDSs including fewer than all of the EDSs selected from the set (original) of EDSs, a second trimmed copy of EDSs being generated based on a different set of DSE parameters than were used to generate the set (original) of EDSs, etc.). For example, for a given trimmed copy of the set of EDSs that are distributedly stored among a particular set of SUs, a same data segment that was dispersed error encoded in accordance with an original set of dispersed error encoding (DSE) parameters to produce the (original) set of EDSs is also dispersed error encoded in accordance with another set of DSE parameters to produce another set of EDSs. A different decode threshold number of this other set of EDSs are needed to recover the data segment, and a different read threshold number of this other set of EDSs provides for reconstruction of the data segment.

Note that any desired different set of DSE parameters may be used to generate a respective trimmed copy of EDSs that corresponds to the set (original) of EDSs. For example, both the respective trimmed copy of EDSs and the set (original) of EDSs are both generated by dispersed error encoding the data segment(s) using different respective sets of DSE parameters (e.g., the data segment(s) undergo dispersed error encoding using a first sets of DSE parameters to generate the set (original) of EDSs, and the data segment(s) undergo dispersed error encoding using a second sets of DSE parameters to generate the respective trimmed copy of EDSs, and so on).

Note that different sets of trimmed copies of EDSs may be based on and include different EDSs therein. For example, a trimmed copy may be initially generated and included/stored in another set of SUs. Subsequently, such trimmed copy can be fully built out to include all of the EDSs of a set of EDSs in a set of SUs in which a trimmed copy of EDSs is initially stored. In some examples, such completion of a trimmed set of EDSs to generate a full copy set of EDSs may be made later when DSN conditions may be more amendable to do so (e.g., less traffic, period of lower activity, freed up processing resources, etc.). In addition, note that as certain versions of EDSs get updated (e.g., when the information dispersal algorithm (IDA), or original version of EDSs, or baseline set of EDSs, etc. gets updated), then other versions (e.g., copies of those EDSs, trimmed copies of those EDSs, etc.) can be updated appropriately in accordance with the various operations and conditions as described herein. This disclosure presents a novel means by which various sets of EDSs including copies and/or trimmed copies of EDSs of a baseline set of EDSs can be synchronized in terms of version level among other characteristics. When one or more SUs store EDSs that are not of a current version, then that SU can be directed to perform by another SU and/or computing device or can perform independently a rebuild of those EDSs at the proper revision level and/or request such proper revision level EDSs from another one or more SUs that store the proper revision level of EDSs.

In an example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

For example, computing device 12 or 16 receives a data access request for a data object (e.g., from another computing device, from being generated therein, etc.). Note that the data object is segmented into a plurality of data segments, and a data segment of the plurality of data segments is dispersed error encoded in accordance with dispersed error encoding parameters to produce a set of encoded data slices (EDSs). Note also that a decode threshold number of EDSs are needed to recover the data segment, and a read threshold number of EDSs provides for reconstruction of the data segment. The set of EDSs are distributedly stored among a first set storage units (SUs) 1110, and a trimmed copy of the set of EDSs that includes fewer than all EDSs of the set of EDSs and includes at least the decode threshold number of EDSs are distributedly stored among a second set of SUs 1120.

The computing device 12 or 16 then determines a first revision number that corresponds to the set of EDSs that are distributedly stored among the set of SUs 1110 and determines a second revision number that corresponds to the trimmed copy of the set of EDSs that are distributedly stored among the second set of SUs 1120. In some examples, another trimmed copy of the set of EDSs are included and distributedly stored among a third set of SUs 1130. Note that different sets of trimmed copy of the set of EDSs may be included respectively in different respective sets of SUs. Also, note that the respective sets of SUs may be located in any desired manner within the DSN. In one example, the SUs of the first set of SUs 1110 are located in relative close proximity to one another (e.g., in a first location such as a first city and/or a first building, etc.), and the SUs of the second set of SUs 1120 are located in relative close proximity to one another (e.g., in a second location such as a second city and/or a second building, etc.). In another example, the SUs of the first set of SUs 1110 are located in various respective locations throughout the DSN (e.g., a first SU of the first set of SUs 1110 in a first location such as a first city and/or a first building, etc., a second SU of the first set of SUs 1110 in a second location such as a second city and/or a second building, etc. and so on), and the SUs of the second set of SUs 1120 are also located at different various respective locations throughout the DSN (e.g., a second SU of the first set of SUs 1120 in a third location such as a third city and/or a third building, etc., a second SU of the second set of SUs 1120 in a fourth location such as a fourth city and/or a fourth building, etc. and so on). In yet another example, different combinations of the respective sets of SUs includes the SUs of the first set of SUs 1110 are located in various respective locations throughout the DSN, and the SUs of the second set of SUs 1120 are located in relative close proximity to one another, or vice versa.

In some examples, the computing device 12 or 16 determines the first revision number that corresponds to the set of EDSs that are distributedly stored among a first set of SUs 1110 by sending a small number of read and/or check messages such as to only the first set of SUs 1110 to probe for a most recent version of the data corresponding to that first set of EDSs (e.g., the data corresponding to the set of EDSs that are distributedly stored among the set of SUs 1110). Similarly, in some examples, the computing device 12 or 16 determines the second revision number that corresponds to the trimmed copy of the set of EDSs that are distributedly stored among the second set of SUs 1120 by sending a small number of read and/or check messages such as to only a second set of SUs 1120 to probe for a most recent version of the data corresponding to that trimmed copy of the set of EDSs (e.g., the data corresponding to the trimmed copy of the set of EDSs that are distributedly stored among the second set of SUs 1120).

In an example of operation and implementation, when the computing device 12 or 16 determines the first revision number that corresponds to the set of EDSs that are distributedly stored among the first set of SUs 1110 by sending the small number of read and/or check messages such as to only the first set of SUs 1110 to probe for a most recent version of the data corresponding to that first set of EDSs and then issues the data access request to the trimmed copy of the set of EDSs that are distributedly stored among the second set of SUs 1120. When the version number of the trimmed copy of the set of EDSs that is returned based on the data access request to the second set of SUs 1120 is not same and/or not the current version of the first revision number that corresponds to the set of EDSs that are distributedly stored among the first set of SUs 1110, then the computing device 12 or 16 issues the data access request to only the set of EDSs that are distributedly stored among the first set of SUs 1110. However, when the version number of the trimmed copy of the set of EDSs that is returned based on the data access request to the second set of SUs 1120 is same and/or the current version of the first revision number that corresponds to the set of EDSs that are distributedly stored among the first set of SUs 1110, then the computing device 12 or 16 continues with the data access request to the trimmed copy of the set of EDSs that are distributedly stored among the second set of SUs 1120.

Note also that the different respective sets of SUs 1110, 1120, and 1130 may each include a same respective number of SUs or different respective numbers of SUs. For example, when a given set of SUs (e.g., the second set of SUs 1120) is to store a trimmed copy of the set of EDSs, then fewer than a pillar number of EDSs within the set (original) of EDSs a may be needed. In the specific example mentioned above, consider that the set (original) of EDSs is based on a 10-16 DSE parameter based system (e.g., such as a system with 16 EDSs based on 16 pillars and a read and/or decode threshold number of 10), and then a particular trimmed copy of set (original) of EDSs may be an generated based on a different DSE parameter based system such as a 3-5 DSE parameter based system (e.g., such as a system with 5 EDSs based on 5 pillars and a read and/or decode threshold number of 3). In this specific example, the second set of SUs 1120 could include fewer SUs than needed to store such a trimmed copy of the set of EDSs (e.g., such as a trimmed copy of the set of EDSs that is narrower than the set (original) of EDSs).

When the second revision number compares favorably to the first revision number, the computing device 12 or 16 then issues the data access request for the data object to the set of EDSs that are distributedly stored among the first plurality of SUs and/or the trimmed copy of the set of EDSs that are distributedly stored among the second plurality of SUs for the decode threshold number of EDSs and/or the read threshold number of EDSs.

In some examples, when the second revision number compares favorably to the first revision number, the computing device 12 or 16 then issues the data access request for the data object to both the set of EDSs that are distributedly stored among the first plurality of SUs and the trimmed copy of the set of EDSs that are distributedly stored among the second plurality of SUs for the decode threshold number of EDSs and/or the read threshold number of EDSs. In various examples, the computing device 12 or 16 selects which set (e.g., set of the EDSs and/or trimmed copy of the set of EDSs) to which the data access request is issued based on various considerations. Examples of such considerations may include communication activity (e.g., traffic, latency, and/or noise, etc.) within the DSN, availability of SU(s) within the first plurality of SUs and/or second plurality of SUs, proximity of the respective SU(s) within the first plurality of SUs and/or second plurality of SUs relative to a computing device 12 or 16, and/or any other consideration(s). For example, the computing device 12 or 16 may issue the data access request for the data object to only one of the set of EDSs that are distributedly stored among the first plurality of SUs or the trimmed copy of the set of EDSs that are distributedly stored among the second plurality of SUs, whichever may be accessed as having a lower traffic, lower latency, and/or lower noise, etc.

Alternatively, when the second revision number compares unfavorably to the first revision number, the computing device 12 or 16 then issues the data access request for the data object to only the set of EDSs that are distributedly stored among the first plurality of SUs for the decode threshold number of EDSs and/or the read threshold number of EDSs.

Also, note that such operations are described above and performed by the computing device 12 or 16 may be based alternatively on a set of EDSs (e.g., original set of EDSs) that are distributedly stored among the set of SUs 1110 and a full copy of the set of EDSs that are distributedly stored among the second set of SUs 1120 as opposed to such a trimmed copy of the set of EDSs. Also, in general, while many examples are described herein with respect to a set of EDSs (e.g., original set of EDSs) and a trimmed copy of the set of EDSs, note than any such implementations and/or operations as described herein may alternatively be made with respect to a set of EDSs (e.g., original set of EDSs) and a full copy of the set of EDS (e.g., a full copy of the original set of EDSs). Moreover, note than any such implementations and/or operations as described herein may alternatively be made with respect to a set of EDSs (e.g., original set of EDSs), a full copy of the set of EDS (e.g., a full copy of the original set of EDSs), and a trimmed copy of the set of EDSs.

In some examples, when the second revision number compares unfavorably to the first revision number, the computing device 12 or 16 then issues a rebuild request to generate another trimmed copy of the set of EDSs having the first revision number based on the set of EDSs having the first revision number to be distributedly stored among the second plurality of SUs.

In even other examples, when the second revision number compares unfavorably to the first revision number, the computing device 12 or 16 then issues a copy request from another trimmed copy of the set of EDSs having the first revision number that are distributedly stored among a third plurality of SUs to be copied to and distributedly stored among the second plurality of SUs in place of the trimmed copy of the set of EDSs having the second revision number.

In other examples, the computing device 12 or 16 issues a first read request and/or a first write request to the first plurality of SUs to determine the first revision number that corresponds to the set of EDSs that are distributedly stored among the first plurality of SUs. The computing device 12 or 16 also issues a second read request and/or a second write request to the second plurality of SUs to determine the second revision number that corresponds to the trimmed copy of the set of EDSs that are distributedly stored among the second plurality of SUs.

In some examples, the computing device 12 or 16 determines a third revision number that corresponds to another trimmed copy of the set of EDSs that are distributedly stored among a third plurality of SUs. The other trimmed copy of the set of EDSs also includes fewer than all EDSs of the set of EDSs and also includes at least the decode threshold number of EDSs. Then, when both the second revision number and the third revision number compare favorably to the first revision number, the computing device 12 or 16 issues the data access request for the data object to the set of EDSs that are distributedly stored among the first plurality of SUs, the trimmed copy of the set of EDSs that are distributedly stored among the second plurality of SUs, and the other trimmed copy of the set of EDSs that are distributedly stored among the third plurality of SUs for the decode threshold number of EDSs and/or the read threshold number of EDSs.

Also, when both the second revision number compares unfavorably to the first revision number and the third revision number compares favorably to the first revision number, computing device 12 or 16 issues the data access request for the data object to only the set of EDSs that are distributedly stored among the first plurality of SUs and the other trimmed copy of the set of EDSs that are distributedly stored among the third plurality of SUs for the decode threshold number of EDSs and/or the read threshold number of EDSs.

Also, when both the second revision number and the third revision number compares unfavorably to the first revision number, computing device 12 or 16 issues the data access request for the data object to only the set of EDSs that are distributedly stored among the first plurality of SUs for the decode threshold number of EDSs and/or the read threshold number of EDSs.

Note that the computing device may be located at a first premises that is remotely located from at least one SU of the primary SUs or plurality of secondary SUs the within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication system, a non-public intranet system, a public internet system, a local area network (LAN), and/or a wide area network (WAN).

Figure 12:
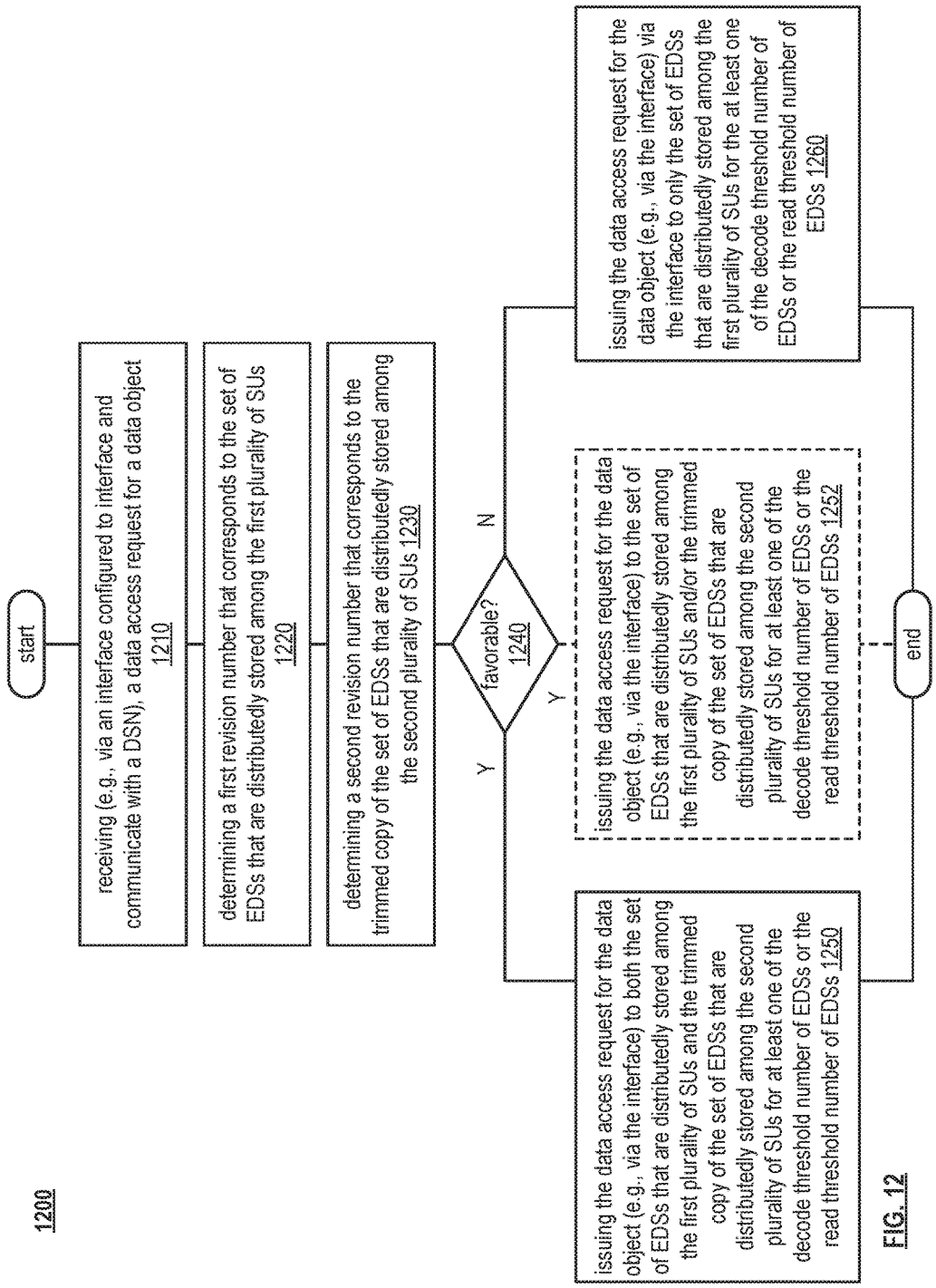
FIG. 12 is a diagram illustrating an embodiment of a method for execution by one or more computing devices in accordance with the present invention.

FIG. 12 is a diagram illustrating an embodiment of a method 1200 for execution by one or more computing devices in accordance with the present invention. The method 1200 begins in step 1210 by receiving (e.g., via an interface configured to interface and communicate with a dispersed storage network (DSN), a data access request for a data object. In some examples, the data object is segmented into data segments, and a data segment of the plurality of data segments is dispersed error encoded in accordance with dispersed error encoding parameters to produce a set of encoded data slices (EDSs). A decode threshold number of EDSs are needed to recover the data segment, and a read threshold number of EDSs provides for reconstruction of the data segment. The set of EDSs are distributedly stored among a first plurality of storage units (SUs), and a trimmed copy of the set of EDSs that includes fewer than all EDSs of the set of EDSs and includes at least the decode threshold number of EDSs are distributedly stored among a second plurality of SUs.

The method 1200 continues in step 1220 by determining a first revision number that corresponds to the set of EDSs that are distributedly stored among the first plurality of SUs. The method 1200 then operates in step 1230 by determining a second revision number that corresponds to the trimmed copy of the set of EDSs that are distributedly stored among the second plurality of SUs.

When the second revision number compares favorably to the first revision number as determined in step 1240, the method 1200 then operates in step 1250 by issuing the data access request for the data object via the interface to both the set of EDSs that are distributedly stored among the first plurality of SUs and the trimmed copy of the set of EDSs that are distributedly stored among the second plurality of SUs for the decode threshold number of EDSs and/or the read threshold number of EDSs.

In other examples, when the second revision number compares favorably to the first revision number as determined in step 1240, the method 1200 then operates in step 1252 by issuing the data access request for the data object via the interface to the set of EDSs that are distributedly stored among the first plurality of SUs and/or the trimmed copy of the set of EDSs that are distributedly stored among the second plurality of SUs for the decode threshold number of EDSs and/or the read threshold number of EDSs. For example, the data access request for the data object may be issued for only one of the set of EDSs that are distributedly stored among the first plurality of SUs or the trimmed copy of the set of EDSs that are distributedly stored among the second plurality of SUs for the decode threshold number of EDSs and/or the read threshold number of EDSs. For one example, when the when the second revision number compares favorably to the first revision number as determined in step 1240, the method 1200 then operates in step 1252 to issue the data access request for the data object for only the trimmed set of EDSs that are distributedly stored among the second plurality of SUs. For another example, when the when the second revision number compares favorably to the first revision number as determined in step 1240, the method 1200 then operates in step 1252 to issue the data access request for the data object for only the set of EDSs that are distributedly stored among the first plurality of SUs.

For yet another example, the data access request for the data object may be issued for the set of EDSs that are distributedly stored among the first plurality of SUs and also for the trimmed copy of the set of EDSs that are distributedly stored among the second plurality of SUs for the decode threshold number of EDSs and/or the read threshold number of EDSs such as described in step 1250. In various examples, the method 1200 makes the decision to which set (e.g., set of the EDSs and/or trimmed copy of the set of EDSs) based on various considerations. Examples of such considerations may include communication activity (e.g., traffic, latency, noise, etc.) within the DSN, availability of SU(s) within the first plurality of SUs and/or second plurality of SUs, proximity of the respective SU(s) within the first plurality of SUs and/or second plurality of SUs relative to a computing device executing the method 1200, and/or any other consideration(s).

Alternatively, when the second revision number compares unfavorably to the first revision number, as determined in step 1240, the method 1200 then operates in step 1260 by issuing the data access request for the data object via the interface to only the set of EDSs that are distributedly stored among the first plurality of SUs for the decode threshold number of EDSs and/or the read threshold number of EDSs.

In some examples, when the second revision number compares unfavorably to the first revision number, the method 1200 operates by issuing via the interface a rebuild request to generate another trimmed copy of the set of EDSs having the first revision number based on the set of EDSs having the first revision number to be distributedly stored among the second plurality of SUs.

In even other examples, when the second revision number compares unfavorably to the first revision number, the method 1200 operates by issuing via the interface a copy request from another trimmed copy of the set of EDSs having the first revision number that are distributedly stored among a third plurality of SUs to be copied to and distributedly stored among the second plurality of SUs in place of the trimmed copy of the set of EDSs having the second revision number.

In yet other examples, the method 1200 operates by issuing via the interface a first read request and/or a first write request to the first plurality of SUs to determine the first revision number that corresponds to the set of EDSs that are distributedly stored among the first plurality of SUs. Then the method 1200 also operates by issuing (e.g., via the interface a second read request and/or a second write request to the second plurality of SUs to determine the second revision number that corresponds to the trimmed copy of the set of EDSs that are distributedly stored among the second plurality of SUs.

In even other examples, the method 1200 operates by determining a third revision number that corresponds to another trimmed copy of the set of EDSs that are distributedly stored among a third plurality of SUs, wherein the other trimmed copy of the set of EDSs also includes fewer than all EDSs of the set of EDSs and also includes at least the decode threshold number of EDSs. Then, when both the second revision number and the third revision number compare favorably to the first revision number, the method 1200 operates by issuing via the interface the data access request for the data object to the set of EDSs that are distributedly stored among the first plurality of SUs, the trimmed copy of the set of EDSs that are distributedly stored among the second plurality of SUs, and the other trimmed copy of the set of EDSs that are distributedly stored among the third plurality of SUs for the decode threshold number of EDSs and/or the read threshold number of EDSs. Also, when both the second revision number compares unfavorably to the first revision number and the third revision number compares favorably to the first revision number, the method 1200 operates by issuing via the interface the data access request for the data object to only the set of EDSs that are distributedly stored among the first plurality of SUs and the other trimmed copy of the set of EDSs that are distributedly stored among the third plurality of SUs for the decode threshold number of EDSs and/or the read threshold number of EDSs.

Also, when both the second revision number and the third revision number compares unfavorably to the first revision number, the method 1200 operates by issuing via the interface the data access request for the data object to only the set of EDSs that are distributedly stored among the first plurality of SUs for the decode threshold number of EDSs and/or the read threshold number of EDSs.

One problem with a copy operation in a DSN, such as in an information dispersal algorithm (IDA)+Copy system is that the copy is not canonical, and may represent an outdated version compared to the instance stored with the IDA. Preventing the copy version from being out of date can be helped by any one or more of the following strategies.

The DSN can utilize a trimmed write's configuration for storing the copy, having multiple secondary locations to which the copy will be written in the event that the default location is down at the time of the write. Upon reads, issue read/check requests to all possible storage locations.

The DSN can issue some small number of read or check requests to the DS units holding the IDA version. Ensure that the revision seen from any DS unit holding an IDA instance is not greater than the revision of the returned copy.

Once the IDA version is determined, the DSN can issue "Read If Revision Greater" requests to the DS units holding slices of the IDA instance. The DS units will then only return data if they hold a revision greater than the one indicated in the request. Wait for responses before returning the content to the requester.

If the DS unit holding the copy instance learns that there is a more recent revision in the IDA instance, it can delete the copy instance it holds and optionally trigger an immediate rebuild. In this way, the probability that the DS processing unit will detect that there is a more recent revision in the canonical IDA instance, is greatly improved, and stale data is less likely to be returned to the requester.

Note that the various examples described herein with respect to copies of EDSs being distributedly stored within SU(s) of the DSN may be implemented with respect to one or more trimmed copies of EDSs and/or full copies of EDSs that are distributedly stored within SU(s) of the DSN. In some examples, such operations as described above such as issuing some small number of read or check requests to the DS units holding the IDA version, issuing "Read If Revision Greater" requests to the DS units holding slices of the IDA instance, and/or deleting the copy instance it holds and optionally triggering an immediate rebuild may be performed with respect to one or more trimmed copies of EDSs and/or full copies of EDSs that are distributedly stored within SU(s) of the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN);
memory that stores operational instructions; and
a processing module operably coupled to the interface and to the memory, wherein the processing module, when operable within the computing device based on the operational instructions, is configured to:
receive a data access request for a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein the set of EDSs are distributedly stored among a first plurality of storage units (SUs), and wherein a trimmed copy of the set of EDSs that includes fewer than all EDSs of the set of EDSs and includes at least the decode threshold number of EDSs are distributedly stored among a second plurality of SUs;
determine a first revision number that corresponds to the set of EDSs that are distributedly stored among the first plurality of SUs;
determine a second revision number that corresponds to the trimmed copy of the set of EDSs that are distributedly stored among the second plurality of SUs;
when the second revision number compares favorably to the first revision number, issue the data access request for the data object to at least one of the set of EDSs that are distributedly stored among the first plurality of SUs or the trimmed copy of the set of EDSs that are distributedly stored among the second plurality of SUs for at least one of the decode threshold number of EDSs or the read threshold number of EDSs; and
when the second revision number compares unfavorably to the first revision number, issue the data access request for the data object to only the set of EDSs that are distributedly stored among the first plurality of SUs for the at least one of the decode threshold number of EDSs or the read threshold number of EDSs.

2. The computing device of claim 1, wherein the processing module, when operable within the computing device based on the operational instructions, is further configured to:
when the second revision number compares favorably to the first revision number, issue the data access request for the data object to both the set of EDSs that are distributedly stored among the first plurality of SUs and the trimmed copy of the set of EDSs that are distributedly stored among the second plurality of SUs for at least one of the decode threshold number of EDSs or the read threshold number of EDSs.

3. The computing device of claim 1, wherein the processing module, when operable within the computing device based on the operational instructions, is further configured to:
when the second revision number compares unfavorably to the first revision number, issue a rebuild request to generate another trimmed copy of the set of EDSs having the first revision number based on the set of EDSs having the first revision number to be distributedly stored among the second plurality of SUs.

4. The computing device of claim 1, wherein the processing module, when operable within the computing device based on the operational instructions, is further configured to:
when the second revision number compares unfavorably to the first revision number, issue a copy request from another trimmed copy of the set of EDSs having the first revision number that are distributedly stored among a third plurality of SUs to be copied to and distributedly stored among the second plurality of SUs in place of the trimmed copy of the set of EDSs having the second revision number.

5. The computing device of claim 1, wherein the processing module, when operable within the computing device based on the operational instructions, is further configured to:
issue at least one of a first read request or a first write request to the first plurality of SUs to determine the first revision number that corresponds to the set of EDSs that are distributedly stored among the first plurality of SUs; and
issue at least one of a second read request or a second write request to the second plurality of SUs to determine the second revision number that corresponds to the trimmed copy of the set of EDSs that are distributedly stored among the second plurality of SUs.

6. The computing device of claim 1, wherein the processing module, when operable within the computing device based on the operational instructions, is further configured to:
determine a third revision number that corresponds to another trimmed copy of the set of EDSs that are distributedly stored among a third plurality of SUs, wherein the another trimmed copy of the set of EDSs also includes fewer than all EDSs of the set of EDSs and also includes at least the decode threshold number of EDSs;
when both the second revision number and the third revision number compare favorably to the first revision number, issue the data access request for the data object to the set of EDSs that are distributedly stored among the first plurality of SUs, the trimmed copy of the set of EDSs that are distributedly stored among the second plurality of SUs, and the another trimmed copy of the set of EDSs that are distributedly stored among the third plurality of SUs for at least one of the decode threshold number of EDSs or the read threshold number of EDSs;
when both the second revision number compares unfavorably to the first revision number and the third revision number compares favorably to the first revision number, issue the data access request for the data object to only the set of EDSs that are distributedly stored among the first plurality of SUs and the another trimmed copy of the set of EDSs that are distributedly stored among the third plurality of SUs for the at least one of the decode threshold number of EDSs or the read threshold number of EDSs; and
when both the second revision number and the third revision number compares unfavorably to the first revision number, issue the data access request for the data object to only the set of EDSs that are distributedly stored among the first plurality of SUs for the at least one of the decode threshold number of EDSs or the read threshold number of EDSs.

7. The computing device of claim 1, wherein another trimmed copy of the set of EDSs are distributedly stored among a third plurality of SUs, wherein the data segment of the plurality of data segments is dispersed error encoded in accordance with other dispersed error encoding parameters to produce another set of EDSs, wherein another decode threshold number of the another set of EDSs are needed to recover the data segment, wherein another read threshold number of the another set of EDSs provides for reconstruction of the data segment.

8. The computing device of claim 1, wherein the computing device is located at a first premises that is remotely located from at least one SU of the first plurality of SUs or the second plurality of SUs within the DSN.

9. The computing device of claim 1 further comprising:
a SU of the first plurality of SUs or the second plurality of SUs within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A computing device comprising:
an interface configured to interface and communicate with a dispersed storage network (DSN);
memory that stores operational instructions; and
a processing module operably coupled to the interface and to the memory, wherein the processing module, when operable within the computing device based on the operational instructions, is configured to:
receive a data access request for a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein the set of EDSs are distributedly stored among a first plurality of storage units (SUs), and wherein a trimmed copy of the set of EDSs that includes fewer than all EDSs of the set of EDSs and includes at least the decode threshold number of EDSs are distributedly stored among a second plurality of SUs;
determine a first revision number that corresponds to the set of EDSs that are distributedly stored among the first plurality of SUs;
determine a second revision number that corresponds to the trimmed copy of the set of EDSs that are distributedly stored among the second plurality of SUs;
when the second revision number compares favorably to the first revision number, issue the data access request for the data object to at least one of the set of EDSs that are distributedly stored among the first plurality of SUs or the trimmed copy of the set of EDSs that are distributedly stored among the second plurality of SUs for at least one of the decode threshold number of EDSs or the read threshold number of EDSs; and
when the second revision number compares unfavorably to the first revision number, issue the data access request for the data object to only the set of EDSs that are distributedly stored among the first plurality of SUs for the at least one of the decode threshold number of EDSs or the read threshold number of EDSs; and at least one of:
issue a rebuild request to generate another trimmed copy of the set of EDSs having the first revision number based on the set of EDSs having the first revision number to be distributedly stored among the second plurality of SUs; or
issue a copy request from another trimmed copy of the set of EDSs having the first revision number that are distributedly stored among a third plurality of SUs to be copied to and distributedly stored among the second plurality of SUs in place of the trimmed copy of the set of EDSs having the second revision number.

12. The computing device of claim 11, wherein the processing module, when operable within the computing device based on the operational instructions, is further configured to:
when the second revision number compares favorably to the first revision number, issue the data access request for the data object to both the set of EDSs that are distributedly stored among the first plurality of SUs and the trimmed copy of the set of EDSs that are distributedly stored among the second plurality of SUs for at least one of the decode threshold number of EDSs or the read threshold number of EDSs.

13. The computing device of claim 11, wherein the processing module, when operable within the computing device based on the operational instructions, is further configured to:
issue at least one of a first read request or a first write request to the first plurality of SUs to determine the first revision number that corresponds to the set of EDSs that are distributedly stored among the first plurality of SUs; and issue at least one of a second read request or a second write request to the second plurality of SUs to determine the second revision number that corresponds to the trimmed copy of the set of EDSs that are distributedly stored among the second plurality of SUs.

14. The computing device of claim 11, wherein the processing module, when operable within the computing device based on the operational instructions, is further configured to:
determine a third revision number that corresponds to another trimmed copy of the set of EDSs that are distributedly stored among the third plurality of SUs, wherein the another trimmed copy of the set of EDSs also includes fewer than all EDSs of the set of EDSs and also includes at least the decode threshold number of EDSs;
when both the second revision number and the third revision number compare favorably to the first revision number, issue the data access request for the data object to the set of EDSs that are distributedly stored among the first plurality of SUs, the trimmed copy of the set of EDSs that are distributedly stored among the second plurality of SUs, and the another trimmed copy of the set of EDSs that are distributedly stored among the third plurality of SUs for at least one of the decode threshold number of EDSs or the read threshold number of EDSs;
when both the second revision number compares unfavorably to the first revision number and the third revision number compares favorably to the first revision number, issue the data access request for the data object to only the set of EDSs that are distributedly stored among the first plurality of SUs and the another trimmed copy of the set of EDSs that are distributedly stored among the third plurality of SUs for the at least one of the decode threshold number of EDSs or the read threshold number of EDSs; and
when both the second revision number and the third revision number compares unfavorably to the first revision number, issue the data access request for the data object to only the set of EDSs that are distributedly stored among the first plurality of SUs for the at least one of the decode threshold number of EDSs or the read threshold number of EDSs.

15. The computing device of claim 11, wherein another trimmed copy of the set of EDSs are distributedly stored among a third plurality of SUs, wherein the data segment of the plurality of data segments is dispersed error encoded in accordance with other dispersed error encoding parameters to produce another set of EDSs, wherein another decode threshold number of the another set of EDSs are needed to recover the data segment, wherein another read threshold number of the another set of EDSs provides for reconstruction of the data segment.

16. The computing device of claim 11 further comprising:
a SU of the first plurality of SUs or the second plurality of SUs within the DSN, a wireless smart phone, a laptop, a tablet, a personal computers (PC), a work station, or a video game device.

17. The computing device of claim 11, wherein the DSN includes at least one of a wireless communication system, a wire lined communication system, a non-public intranet system, a public internet system, a local area network (LAN), or a wide area network (WAN).

18. A method for execution by a computing device, the method comprising:
receiving, via an interface configured to interface and communicate with a dispersed storage network (DSN), a data access request for a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein the set of EDSs are distributedly stored among a first plurality of storage units (SUs), and wherein a trimmed copy of the set of EDSs that includes fewer than all EDSs of the set of EDSs and includes at least the decode threshold number of EDSs are distributedly stored among a second plurality of SUs;
determining a first revision number that corresponds to the set of EDSs that are distributedly stored among the first plurality of SUs;
determining a second revision number that corresponds to the trimmed copy of the set of EDSs that are distributedly stored among the second plurality of SUs;
when the second revision number compares favorably to the first revision number, issuing the data access request for the data object via the interface to at least one of the set of EDSs that are distributedly stored among the first plurality of SUs or the trimmed copy of the set of EDSs that are distributedly stored among the second plurality of SUs for at least one of the decode threshold number of EDSs or the read threshold number of EDSs; and
when the second revision number compares unfavorably to the first revision number, issuing the data access request for the data object via the interface to only the set of EDSs that are distributedly stored among the first plurality of SUs for the at least one of the decode threshold number of EDSs or the read threshold number of EDSs.

19. The method of claim 18 further comprising:
when the second revision number compares favorably to the first revision number, issuing the data access request for the data object via the interface to both the set of EDSs that are distributedly stored among the first plurality of SUs and the trimmed copy of the set of EDSs that are distributedly stored among the second plurality of SUs for at least one of the decode threshold number of EDSs or the read threshold number of EDSs.

20. The method of claim 18 further comprising:
when the second revision number compares unfavorably to the first revision number, issuing via the interface a rebuild request to generate another trimmed copy of the set of EDSs having the first revision number based on the set of EDSs having the first revision number to be distributedly stored among the second plurality of SUs.

21. The method of claim 18 further comprising:
when the second revision number compares unfavorably to the first revision number, issuing via the interface a copy request from another trimmed copy of the set of EDSs having the first revision number that are distributedly stored among a third plurality of SUs to be copied to and distributedly stored among the second plurality of SUs in place of the trimmed copy of the set of EDSs having the second revision number.

22. The method of claim 18 further comprising:
issuing via the interface at least one of a first read request or a first write request to the first plurality of SUs to determine the first revision number that corresponds to the set of EDSs that are distributedly stored among the first plurality of SUs; and issuing via the interface at least one of a second read request or a second write request to the second plurality of SUs to determine the second revision number that corresponds to the trimmed copy of the set of EDSs that are distributedly stored among the second plurality of SUs.

23. The method of claim 18 further comprising:

determining a third revision number that corresponds to another trimmed copy of the set of EDSs that are distributedly stored among a third plurality of SUs, wherein the another trimmed copy of the set of EDSs also includes fewer than all EDSs of the set of EDSs and also includes at least the decode threshold number of EDSs;

when both the second revision number and the third revision number compare favorably to the first revision number, issuing via the interface the data access request for the data object to the set of EDSs that are distributedly stored among the first plurality of SUs, the trimmed copy of the set of EDSs that are distributedly stored among the second plurality of SUs, and the another trimmed copy of the set of EDSs that are distributedly stored among the third plurality of SUs for at least one of the decode threshold number of EDSs or the read threshold number of EDSs;

when both the second revision number compares unfavorably to the first revision number and the third revision number compares favorably to the first revision number, issuing via the interface the data access request for the data object to only the set of EDSs that are distributedly stored among the first plurality of SUs and the another trimmed copy of the set of EDSs that are distributedly stored among the third plurality of SUs for the at least one of the decode threshold number of EDSs or the read threshold number of EDSs; and when both the second revision number and the third revision number compares unfavorably to the first revision number, issuing via the interface the data access request for the data object to only the set of EDSs that are distributedly stored among the first plurality of SUs for the at least one of the decode threshold number of EDSs or the read threshold number of EDSs.

24. The method of claim 18, wherein the computing device is a SU of the first plurality of SUs or the second plurality of SUs within the DSN, a wireless smart phone, a laptop, a tablet, a personal computers (PC), a work station, or a video game device.

25. The method of claim 18, wherein the DSN includes at least one of a wireless communication system, a wire lined communication system, a non-public intranet system, a public internet system, a local area network (LAN), or a wide area network (WAN).

* * * * *